US009862422B2

(12) United States Patent
Jarvis et al.

(10) Patent No.: US 9,862,422 B2
(45) Date of Patent: Jan. 9, 2018

(54) FASTENER FOR PROVIDING A CLAMP LOAD BETWEEN TWO PARTS

(71) Applicant: FORD GLOBAL TECHNOLOGIES, LLC, Dearborn, MI (US)

(72) Inventors: David Lee Jarvis, Madison Heights, MI (US); Steven C. Dworack, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 15/054,175

(22) Filed: Feb. 26, 2016

(65) Prior Publication Data
US 2017/0247060 A1 Aug. 31, 2017

(51) Int. Cl.
*B62D 25/02* (2006.01)
*F16B 21/08* (2006.01)

(52) U.S. Cl.
CPC .......... *B62D 25/025* (2013.01); *F16B 21/084* (2013.01)

(58) Field of Classification Search
CPC ...... B62D 25/025; F16B 5/0088; F16B 21/06; F16B 21/065; F16B 21/08; F16B 21/084; F16B 21/086; Y10S 411/913; Y10T 24/309; Y10T 24/42
See application file for complete search history.

(56) References Cited

U.S. PATENT DOCUMENTS

| | | | | | |
|---|---|---|---|---|---|
| 2,853,913 | A | * | 9/1958 | Rapata | B60R 13/0206 29/453 |
| 3,611,861 | A | * | 10/1971 | Schulze | F16B 21/082 411/508 |
| 3,905,570 | A | * | 9/1975 | Nieuwveld | F16L 3/127 24/339 |
| 4,568,215 | A | * | 2/1986 | Nelson | B29C 65/0672 24/297 |
| 4,762,437 | A | * | 8/1988 | Mitomi | F16B 21/02 24/297 |
| 4,911,495 | A | * | 3/1990 | Haga | B62D 25/02 296/209 |
| 5,191,513 | A | * | 3/1993 | Sugiura | H05K 7/142 174/138 D |
| 5,232,322 | A | * | 8/1993 | Regensburger | F16B 13/02 411/33 |

(Continued)

OTHER PUBLICATIONS

ITW Fastex Push-In Clips, Jan. 30, 2008, http://www.itw-fastex.com/catalog/index.php/dw/op/a/7/c/17/p/12?m=no, Jan. 30, 2008.

(Continued)

*Primary Examiner* — D Glenn Dayoan
*Assistant Examiner* — Paul Chenevert
(74) *Attorney, Agent, or Firm* — Jason Rogers; Brooks Kushman P.C.

(57) ABSTRACT

A rocker panel assembly for a vehicle includes an upper rocker panel, a lower rocker panel, and a fastener. The fastener connects the upper and lower rocker panels. The fastener has a frustoconical tip to locate the fastener on the lower rocker panel, a body with a plurality of fins to stabilize the fastener between the upper and lower rocker panels, and a shoulder including an arrow-head configured to clamp the lower rocker panel to the upper rocker panel between the shoulder and a head of the fastener.

14 Claims, 3 Drawing Sheets

(56) References Cited

U.S. PATENT DOCUMENTS

| | | | | |
|---|---|---|---|---|
| 5,322,402 A * | 6/1994 | Inoue | ............... | F16B 5/123 |
| | | | | 411/41 |
| 5,906,465 A * | 5/1999 | Sato | ............... | F16B 21/084 |
| | | | | 248/68.1 |
| 6,749,157 B2 * | 6/2004 | Takeuchi | ............ | F16B 21/084 |
| | | | | 24/16 PB |
| 6,752,576 B2 * | 6/2004 | Johansson | .......... | F16B 13/0833 |
| | | | | 411/21 |
| 6,804,864 B2 * | 10/2004 | Kirchen | ............. | F16B 5/0642 |
| | | | | 24/289 |
| 6,811,210 B2 * | 11/2004 | Granger | ............. | B60R 13/04 |
| | | | | 24/297 |
| 6,979,163 B2 * | 12/2005 | Brletich | ............. | F16B 21/084 |
| | | | | 411/418 |
| 7,001,128 B2 * | 2/2006 | Kuntze | ............. | F16B 5/0642 |
| | | | | 24/297 |
| 7,207,759 B2 * | 4/2007 | Kato | ............... | F16B 19/1081 |
| | | | | 411/41 |
| 7,575,390 B2 * | 8/2009 | Yanagita | ............ | F16F 9/0227 |
| | | | | 24/297 |
| 7,658,583 B2 * | 2/2010 | Homner | ............. | F16B 5/0642 |
| | | | | 411/510 |
| 7,884,704 B2 * | 2/2011 | Iwano | ............... | B60J 5/0427 |
| | | | | 340/435 |
| 7,950,889 B2 | 5/2011 | Homner | | |
| 8,262,154 B2 * | 9/2012 | Garnett | ............. | B60J 5/04 |
| | | | | 296/1.08 |
| 8,419,099 B2 * | 4/2013 | Inoue | ............... | B62D 35/007 |
| | | | | 24/297 |
| 8,769,778 B2 * | 7/2014 | Kim | ................. | B60R 13/0206 |
| | | | | 24/289 |
| 9,033,635 B2 | 5/2015 | Wesolowska | | |
| 9,683,591 B2 * | 6/2017 | Lo | ................... | F16B 21/084 |
| 2004/0083583 A1 * | 5/2004 | Bradley | ............. | F16B 5/0657 |
| | | | | 24/297 |
| 2004/0155162 A1 * | 8/2004 | Schneider | .......... | F16B 19/02 |
| | | | | 248/222.13 |
| 2005/0093343 A1 * | 5/2005 | Tokumoto | .......... | B60R 13/04 |
| | | | | 296/209 |
| 2008/0298925 A1 * | 12/2008 | Shinozaki | .......... | F16B 19/1081 |
| | | | | 411/48 |
| 2012/0110793 A1 * | 5/2012 | Watanabe | .......... | B60R 13/0206 |
| | | | | 24/289 |
| 2015/0219136 A1 * | 8/2015 | Koelling | ............ | F16B 21/084 |
| | | | | 411/510 |

OTHER PUBLICATIONS

Wuerth, Ford Wheel Opening Moulding Retainer, http://www.shopwurthusa.com/wurthstorefront/Auto-Body-Clips-%26-Fasteners/Ford/Push-in-%26-Push-Type/Ford-Wheel-Opening-Moulding-Retainer/p/150120177, Nov. 4, 2015.

* cited by examiner

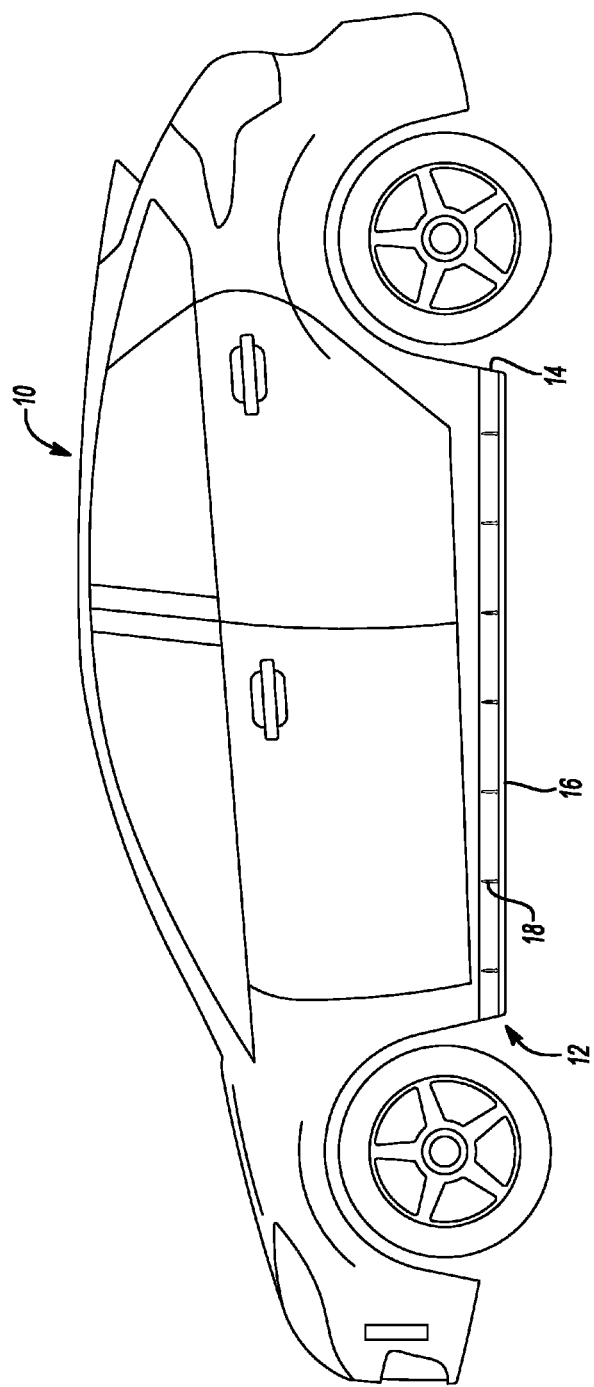

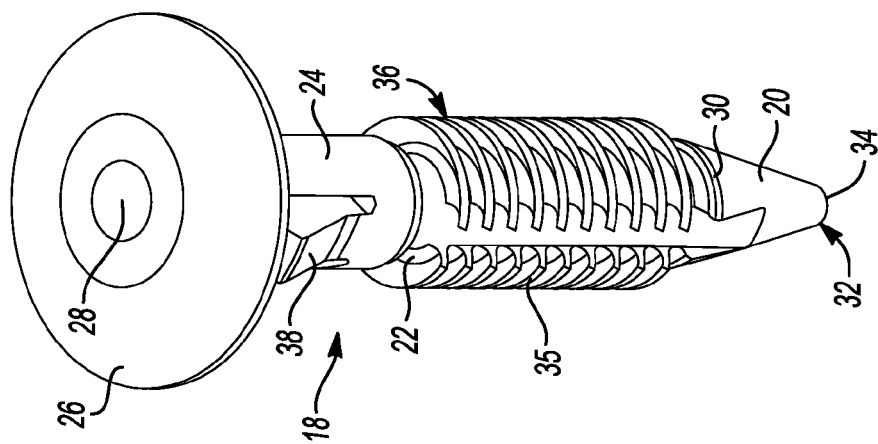
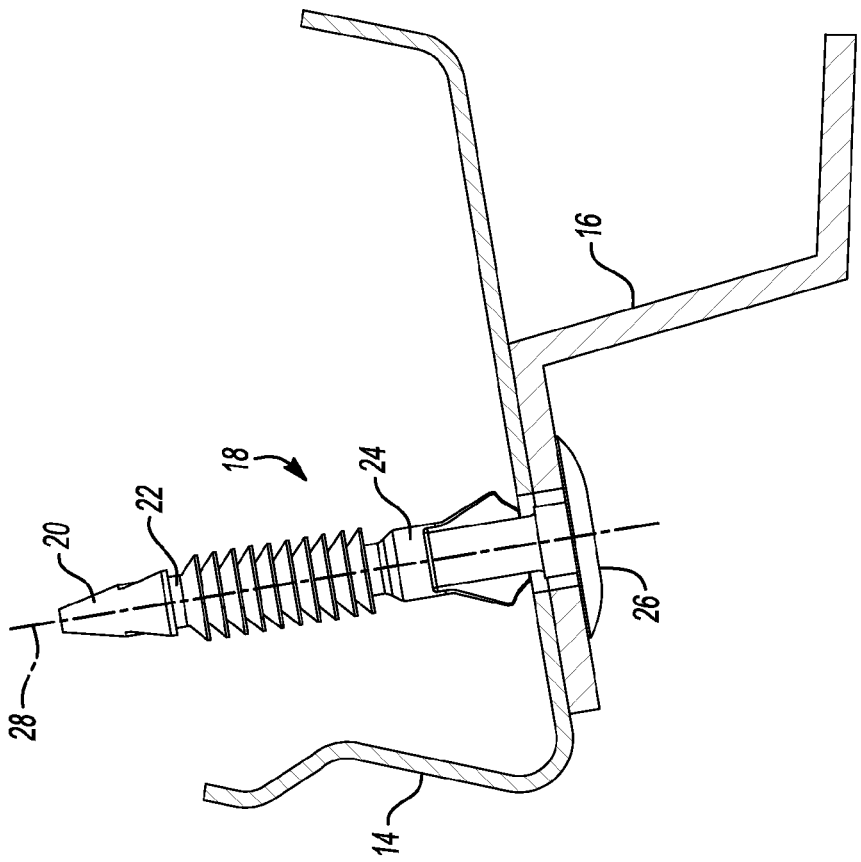

FASTENER FOR PROVIDING A CLAMP LOAD BETWEEN TWO PARTS

TECHNICAL FIELD

The present disclosure relates to fasteners to assemble a rocker panel assembly.

BACKGROUND

Rocker panel assemblies for vehicles typically require attachment between two panels. During operation of the vehicle, detachment between the two panels may cause certain problems. For example, as air moves around the vehicle during travel, one panel may bounce against the other panel and cause rattling within the vehicle. Typically, foam is placed between the panels to reduce the rattling. Adding foam between the panels increases cost of the vehicle. Improving the attachment between the panels reduces the rattle and eliminates the need for the foam.

SUMMARY

A fastener includes a head and a body. The body extends perpendicularly from the head along an axis. The body also includes a shoulder adjacent to the head having a triangularly-shaped clamp mechanism to secure a rocker panel assembly between the body and head. The body further incudes a shaft including a plurality of fins adjacent the shoulder configured to stabilize the body within the rocker panel assembly. The body also includes a frustoconical tip configured to locate the body on the rocker panel assembly.

A rocker assembly for a vehicle includes an upper rocker panel, a lower rocker panel, and a fastener. The fastener connects the upper and lower rocker panels. The fastener has a frustoconical tip to locate the fastener on the lower rocker panel, a body with a plurality of fins to stabilize the fastener between the upper and lower rocker panels, and a shoulder including an arrow-head configured to clamp the lower rocker panel to the upper rocker panel between the shoulder and a head of the fastener.

A vehicle includes a rocker panel assembly and a fastener. The rocker panel assembly includes an upper rocker panel and a lower rocker panel. The fastener extends between the upper and lower rocker panels. The fastener has a head configured to have a flat, planar relationship with a first surface of the lower rocker panel, a frustoconical tip disposed along an axis at a distance from the head to locate the fastener at the first surface of the lower rocker panel before insertion, a body along the axis, adjacent to the tip having a plurality of fins to hold the fastener within the upper rocker panel during insertion, and a shoulder along the axis adjacent and between the head and the body. The shoulder has a double-diamond clamping mechanism to retain the lower rocker panel against the upper rocker panel after insertion.

BRIEF DESCRIPTION OF THE DRAWINGS

FIG. 1 is a schematic of a vehicle having a rocker panel assembly attached using fasteners;

FIG. 2 is a cross-sectional view of an upper rocker panel and a lower rocker panel attached using a fastener;

FIG. 3 is a perspective view of the fastener used to attach the upper and lower rocker panels.

DETAILED DESCRIPTION

Figure 4:
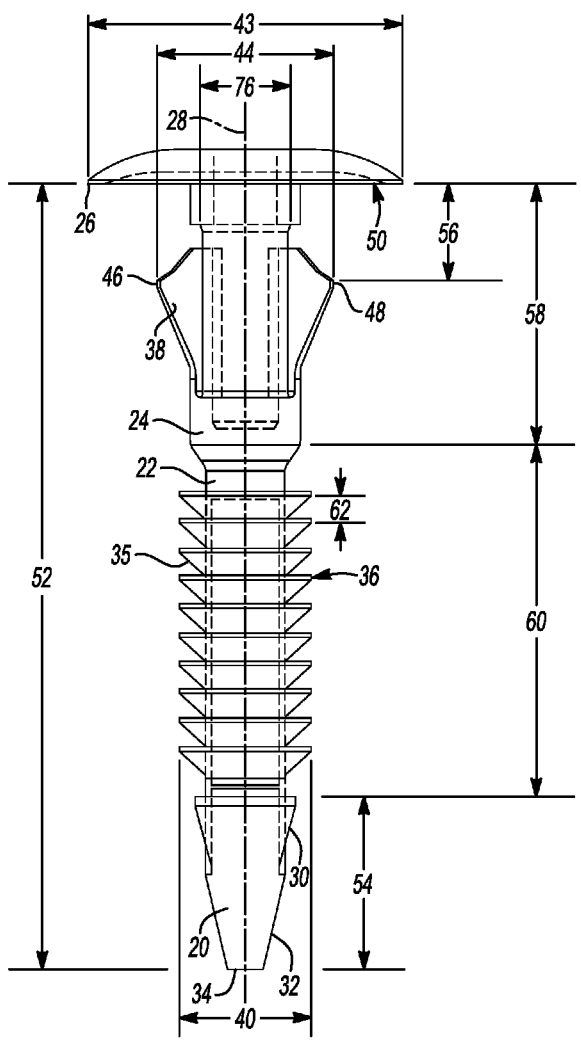
FIG. 4 is a side view of the fastener used to attach the upper and lower rocker panels.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 depicts a side schematic view of a vehicle 10. The vehicle 10 includes a rocker panel assembly 12. The rocker panel assembly 12 includes an upper rocker panel 14 and a lower rocker panel 16. The upper rocker panel 14 is attached to the lower rocker panel 16 using a plurality of fasteners 18. The plurality of fasteners 18 extend along the length of the upper rocker panel 14. The plurality of fasteners 18 provides a rigid attachment between the upper rocker panel 14 and the lower rocker panel 16. The fasteners 18 allow for attachment between the upper rocker panel 14 and the lower rocker panel 16 in a way such that contact is maintained between the upper rocker panel 14 and the lower rocker panel 16 during vehicle travel. The lower rocker panel 16 is fastened to the upper rocker panel 14 such that a gap (not shown) between the lower rocker panel 16 and the upper rocker panel 14 is negligible.

Maintaining constant contact between the upper rocker panel 14 and the lower rocker panel 16, and negating the gap between the upper rocker panel 14 and the lower rocker panel 16 prevents air from flowing into the rocker panel assembly 12. Preventing air flowing through the upper rocker panel 14 and the lower rocker panel 16, the rocker panel assembly 12 eliminates rattling of the rocker panel assembly 12. By using the fasteners 18 to assemble the rocker panel assembly 12, the lower rocker panel 16 does not interfere with the upper rocker panel 14 and eliminates using foam to compensate for the rattle. Eliminating foam between the upper rocker panel 14 and the lower rocker panel 16 decreases the overall cost of the vehicle 10. Attachment between the upper rocker panel 14 and the lower rocker panel 16 using the fasteners 18 will be discussed in more detail with reference to the other figures.

Referring to FIG. 2, a cross-sectional view of the fastener 18 extending through the lower rocker panel 16 and into the upper rocker panel 14 is depicted. As will be described with more detail with reference to the other figures, the fastener 18 may be a two-stage. For example, once located on the lower rocker panel 16, the fastener 18 is configured to be held within the upper rocker panel 14 during a first stage and clamp the lower rocker panel 16 to the upper rocker panel 14 at a second stage. During the first stage, the fastener 18 is designed to be stabilized as it pierces through the lower rocker panel 16 into the upper rocker panel 14. Once through the lower rocker panel 16 and into the upper rocker panel, the second stage of the fastener 18 provides a clamping force between the lower rocker panel 16 and the upper rocker panel 14. The clamping force that holds the rocker panel assembly 12 together prevents air from flowing between the upper rocker panel 14 and the lower rocker panel 16, eliminating rattling that occurs within the rocker panel assembly 12.

The fastener 18 is comprised of three main segments. The fastener 18 includes a tip 20, a body 22, and a shoulder 24. The tip 20, the body 22, and the shoulder 24 are actually aligned along an axis 28. The tip 20 is adjacent to the body 22 and the body 22 is adjacent to shoulder 24. The fastener 18 further includes a head 26. The head 26 is disposed adjacent to the shoulder 24. The clamping force between the lower rocker panel 16 and the upper rocker panel 14 is created by the relationship between the head 26 and the shoulder 24. For example, the head 26 acts as a first jaw and the configuration of the shoulder 24 acts as a second jaw clamping the lower rocker panel 16 to the upper rocker panel 14. The configuration of the body 22 stabilizes the fastener 18 and maintains a position of the fastener 18 during insertion into the upper welded panel 14. The tip 20 is configured to locate the fastener 18 on the lower welded panel 16 to ease insertion of the fastener 18 through the lower welded panel 16 into the upper welded panel 14. Configurations of the shoulder 24, body 22, and tip 20 will be described in more detail with reference to the other figures.

FIG. 3 depicts a perspective view of the head 26, the shoulder 24, the body 22, and tip 20 of the fastener 18 and FIG. 4 depicts a side view of the dual stage fastener 18. The tip 20 defines a frustoconical shape and is disposed at a distance from the head 26 along the axis 28. Specifically, the tip 20 is disposed adjacent the body 22 along axis 28 and creates initial contact with the lower rocker panel 16. The frustoconical shape of the tip 20 allows a first end 30 of the tip 20 to be wider than a second end 32 of the tip 20. The second end 32 of the tip 20 has a flat surface 34, which allows the fastener 18 to be seated on the lower rocker panel 16 before insertion. Further, the narrower second end 32 of the tip 20 allows for easier piercing of the lower rocker panel. Using a frustoconical tip 20 allows for easier insertion of the fastener 18 into the lower rocker panel 16.

The body 22 is disposed along axis 28 between the tip 20 and the shoulder 24. The body 22 is segmented using a plurality of fins 36. Depicted in FIG. 3, the body includes ten individual fins 35 within the plurality of fins 36. However, the number of individual fins 35 included in the plurality of fins 36 may be optimized based on the desired length of the fastener 18. The plurality of fins 36 extends substantially around the entire section of the body 22. The plurality of fins 36 may define a circular and frustoconical shape. The plurality of fins 36 is angled similiarly to the tip 20 to ease insertion of the body 22 and to allow the fins 36 to expand once inserted. The plurality of fins 36 may be composed of a thin material. The thin material allows the fins 36 to be flexible as they are inserted through the lower rocker panel 16 into the upper rocker panel 14. Therefore, as the fins 36 slide through the lower rocker panel 16, a wider diameter 40 of the fins 36 is greater than the aperture defined in the lower rocker panel 16 to receive the fastener 18. The wider diameter 40 of the fins 36 provides a temporary hold feature for the fastener 18 during insertion through the lower rocker panel 16 and into the upper rocker panel 14. The temporary hold feature produced by the plurality of fins 36 stabilizes the fastener 18 during insertion.

The plurality of fins 36 maintains a position of the fastener 18 such that the fastener 18 is inserted through the lower rocker panel 16 and into the upper rocker panel 14 in a substantially straight orientation. Maintaining the straight orientation during insertion of the fastener 18 eases assembly between the lower rocker panel 16 in the upper rocker panel 14. Further, because the plurality of fins 36 has a wider diameter 40, which is wider than the aperture through the lower rocker panel 16, the fastener 18 may not need to be inserted completely. During assembly, it may be advantageous to partially insert the fastener 18 through the lower rocker panel 16 before complete insertion through the upper rocker panel 14. The plurality of fins 36 holds the fastener 18 during partial insertion through the lower rocker panel 16. The plurality of fins 36 on the body 22 defines a first stage of the fastener 18. For example, partial insertion of the fastener 18 may be the first stage of the insertion process and the plurality of fins 36, as described above, stabilize and hold the fastener throughout this first stage.

The shoulder 24 is disposed along axis 28 between the head 26 and the body 22. As stated above, the shoulder 24 is configured to clamp the lower rocker panel 16 to the upper rocker panel 14. The shoulder 24 defines a double diamond, or arrowhead configuration. For example, the shoulder 24 includes two triangularly shaped clamping mechanisms 38. The clamping mechanisms 38 are defined in an opposite orientation from each other. The clamping mechanisms 38 define an overall diameter 44 that exceeds the diameter of the fins 36, but is less than a diameter 43 of the head 26. Further, the clamping mechanisms 38 may be composed of a relatively flexible material and angled such that the clamping mechanisms 38 may flex to be inserted through the lower rocker panel 16 and the upper rocker panel 14. Therefore, once through the lower rocker panel 16 and the upper rocker panel 14, the clamping mechanisms expand and hold the rocker panel assembly 12 together.

The diameter 44 of the clamping mechanisms 38 is defined by the distance between a first peak 46 and a second peak 48 of the triangularly shaped clamping mechanism 38. The distance from the first peak 46 and the second peak 48, and a first surface 50 of the head 26 may be optimized based on the thickness of the lower rocker panel 16 and the upper rocker panel 14. For example, in order to provide clamping between the upper rocker panel 14 and the lower rocker panel 16 to prevent rattling, the distance between the first peak 46 and the second peak 48, and the first surface 50 of the head 26 may be found by adding the thicknesses of the upper rocker panel 14 and the lower rocker panel 16. This allows the first surface 50 head 26 to act as a first jaw and the clamping mechanisms 38 to act as a second jaw, securing the upper rocker panel 14 to the lower rocker panel 16, as stated above. While depicted and described as a dual diamond or dual arrowhead configuration, three or four triangularly shaped clamping mechanisms 38 may be used on opposing sides of the shoulder 24.

The clamping mechanisms 38 defined on the shoulder 24 act as a second stage of the fastener 18. Once fully inserted, the fastener 18 clamps the upper rocker panel 14 to the lower rocker panel 16. Clamping of the rocker panel assembly 12 occurs after the plurality of fins 36 holds the fastener 18 through insertion. The clamping mechanisms 38 provide a separate function different from the plurality of fins 36 and therefore define a second stage for the fastener 18. The plurality of fins 36 and the clamping mechanisms 38 allow the fastener 18 to be a two-stage fastener. A dual, or two-stage fastener 18 eases the assembly process and provides a cost-effective process for producing rattle between the upper rocker panel 14 and the lower rocker panel 16. Using only the plurality of fins 36 may not provide any clamping between the upper rocker panel 14 and the lower rocker 16. Likewise, using only the clamping mechanisms 38 may not provide a stable insertion, as described above. The dual stage fastener 18 may be configured to be held within the upper rocker panel 14 as well as clamp the upper rocker panel 14 to the lower rocker panel 16 to achieve a sustainable clamp between the upper rocker panel 14 and the lower rocker panel 16 without creating an assembly hardship.

The side view of the fastener 18 depicts the configurations of the tip 20, the plurality of fins 36 of the body 22, the double diamond clamping mechanisms 38 of the shoulder 24, and the head 26. The dimensions of the fastener 18 may vary depending on vehicle size, placement within the vehicle, or different vehicle body styles. For example, larger vehicles may require fasteners 18, which have larger diameter features than smaller vehicles, may require a fastener 18 with smaller diameter features. Likewise, a length 52 of the fastener 18 may vary depending on rocker panel assembly thickness. Therefore, a broad range of dimensions may be used with the dual stage fastener 18.

While some dimensions of the fastener 18 may be driven by vehicle size, other dimensions such as a length and orientation may be driven by manufacturing assembly processes. For example, the fastener 18 defines an overall length 52 to allow for locating the fastener 18 before insertion of the fastener through the rocker panel assembly. The length 52 of the fastener 18 may be adjusted using a length 54 of the tip 20. As will be described in more detail below, a length 56 between the clamping mechanisms 38 and the head 26 is driven by panel thickness based on vehicle size or type. The length 56 drives an overall length 58 of the shoulder 24. A length 60 of the body 22 and the distance between the each fin 35 within the plurality of fins 36 may also be driven by panel thickness based on vehicle size or type. Therefore, the frustoconical tip 20 allows the fastener 18 to vary in length 52 in order to locate the fastener 18 on the rocker panel assembly 12.

The length 60 of the body 22 provides the first stage of the fastener 18. The overall length 60 may be defined based upon the overall panel thickness of the rocker panel assembly. However the length 60 of the body is such that the body stabilizes the fastener 18 during insertion. The plurality of fins 36 defined on the body 22 uses a distance 62 between individual fins 35 to define an orientation such that the body 22 acts as a stabilizer for the fastener 18. As depicted in FIG. 4, the distance 62 between individual fins 35 of the plurality of fins 36 is consistent along the overall length 60 of the body 22.

While a consistent distance 62 is shown in FIG. 4, other orientations may also be contemplated. For example, the distance 62 between individual fins 35 may vary along the length 60 of the body 22. Likewise, the distance 62 between individual fins 35 may provide a combination of both consistent distances 62 and varying distances 62 based on the stabilization requirements of the fastener 18 during insertion into the panel assembly 12. The orientation of the plurality of fins 36 may be optimized based on manufacturing processes.

The number and diameter of the fins within the plurality of fins 36 may also vary based on vehicle requirements. For example, using a larger distance 62 between fins and a consistent overall length 60 of the body 22, the body 22 may use fewer fins 35. Likewise, using a smaller distance 62 between fins 35 and a consistent overall length 60 of the body 22, the body may use more fins 35. The distance 62 between the fins 35 and the length 60 of the body 22 may be optimized based on stabilization requirements of the fastener 18 during insertion into the panel assembly 12 and ease of manufacturing processes.

The plurality of fins 36 may also define a diameter 40 based on a size and type of the vehicle. For example, larger vehicles may require the body 22 to define a plurality of fins 36 having a larger diameter 40. Smaller vehicles may require the body 22 to define a plurality of fins 36 having a smaller diameter 40. The diameter 40 of the plurality of fins 36 may be optimized based on manufacturing assembly processes for a variety of different vehicles. The diameter, number and orientation of the fins 35 allow the fastener 18 to ease manufacturing by stabilizing the fastener 18 within the rocker panel assembly 12.

The shoulder 24 defines a second stage of the fastener 18 and may have dimensions driven by the size and type of the vehicle. As stated above, the shoulder 24 uses an arrowhead type clamping mechanism 38 to secure the fastener 18 and clamp the rocker panel assembly 12 together. The distance between the first peak 46 and the second peak 48 defines an overall diameter 58 of the shoulder 24.

For example, the distance 44 between the first peak 46 and the second peak 48 allows the shoulder 24 to clamp the rocker panel assembly 12 between the first peak 46 and the second peak 48 and the first surface 50 of the head 26. Therefore, the overall length 58 of the shoulder may be such that the clamping mechanism 38 provides enough force to hold the rocker panel assembly 12, which is provided by the distance 44 between the first peak 46 and the second peak 48. Larger vehicles may require the distance 44 between the first peak 46 and the second peak 48 to be larger than smaller vehicles.

Likewise, a diameter 76 of the shoulder 24 may vary based on the amount of clamping force required by the clamping mechanisms 38. For example, the shoulder 24 having a larger diameter 76 may provide more rigidity and stiffness to the fastener 18 to withstand the clamping force on the clamping mechanisms 38. Likewise, the shoulder 24 having a smaller diameter 76 may allow the fastener 18 to be used in applications requiring smaller through holes defined in the rocker panel assembly 12. By varying the diameter 76 of the shoulder 24 based on the stiffness and hole size of different vehicle types and by adjusting the distance 44 between the first peak 46 and the second peak 48, the shoulder 24 aids in allowing the fastener 18 to be used in a variety of applications.

The head 26 of the fastener 18 may also vary in dimensions based on vehicle size and type. The head 26 has an overall diameter 43 that allows the first surface 50 of the head 26 to provide the requisite clamping force to reduce a squeak and rattle between the panel assembly 12. Therefore, the diameter 43 of the head 26 depends upon the size and type of the vehicle. For example, larger vehicles may require a head 26 having a larger diameter 43 and smaller vehicles may require a head 26 having a smaller diameter 43 to account for the holes within the rocker panel assembly 12. Further, the diameter 43 of the head 26 may be optimized based upon the clamping force exerted by the clamping mechanisms 38 of the shoulder 24. For example, if a large clamping force is required between the first surface 50 of the head 26 and the clamping mechanisms 38 of the shoulder 24, a larger diameter 43 of the head may be used to increase the stiffness and rigidity provided by the fastener 18. The two-stage fastener 18 uses a configuration such that the dimensions of the fastener 18 may be used across a variety of applications.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A fastener comprising:
a body extending perpendicularly from a head along an axis, and including a shoulder having a double-diamond clamp mechanism to retain upper and lower rocker panels between the body and head after insertion, a shaft including a plurality of fins adjacent the shoulder to hold the body within the upper rocker panel during insertion, and a frustoconical tip configured to locate the body on the lower rocker panel before insertion.

2. The fastener of claim 1, wherein the plurality of fins on the shaft are configured to hold the fastener within a hole defined on the lower rocker panel.

3. The fastener of claim 1, wherein a width of the clamp mechanism exceeds a width of the fins.

4. The fastener of claim 1, wherein a width of the fins exceeds a width of the tip.

5. The fastener of claim 1, wherein the shaft defines a length that exceeds the length of the shoulder.

6. The fastener of claim 1, wherein the shaft defines a length that exceeds a length of the tip.

7. The fastener of claim 1, wherein the shoulder defines a length that exceeds a length of the tip.

8. A rocker assembly for a vehicle comprising:
an upper rocker panel;
a lower rocker panel; and
a fastener connecting the upper and lower rocker panels, the fastener having a frustoconical tip to locate the fastener on the lower rocker panel before insertion, a body with a plurality of fins to hold the fastener between the upper and lower rocker panels during insertion, and a shoulder including a double-diamond head configured to clamp the lower rocker panel to the upper rocker panel between the shoulder and a head of the fastener after insertion.

9. The rocker assembly of claim 8, wherein the shoulder is configured to maintain planar contact between the upper rocker panel and the lower rocker panel.

10. The rocker assembly of claim 8, wherein the plurality of fins is configured to engage a hole defined in the upper rocker panel along a length of the body.

11. The rocker assembly of claim 8, wherein the tip is configured to locate the fastener within a hole defined on the lower rocker panel.

12. The rocker assembly of claim 8, wherein the head is disposed adjacent and at a distance from the shoulder such that a thickness of the upper rocker panel and a thickness of the lower rocker panel fits between the head and the arrowhead.

13. A vehicle comprising:
a rocker panel assembly including an upper rocker panel and a lower rocker panel; and
a fastener extending between the upper and lower rocker panels, the fastener having
a head configured to have a flat, planar relationship with a first surface of the lower rocker panel,
a frustoconical tip disposed along an axis at a distance from the head to locate the fastener at the first surface of the lower rocker panel before insertion,
a body along the axis, adjacent to the tip having a plurality of fins to hold the fastener within the upper rocker panel during insertion, and
a shoulder along the axis adjacent and between the head and the body, the shoulder having a double-diamond clamping mechanism to retain the lower rocker panel against the upper rocker panel after insertion.

14. The vehicle of claim 13, wherein the body and the shoulder define a two-stage fastener such that the body defines a first stage and the shoulder defines a second stage during insertion of the fastener through the rocker panel assembly.

* * * * *